US012233618B2

(12) United States Patent
Schwarz et al.

(10) Patent No.: US 12,233,618 B2
(45) Date of Patent: Feb. 25, 2025

(54) DEVICE AND METHOD FOR SEPARATING SUBSTANCES OF DIFFERENT FLOWABILITY THAT ARE MIXED TOGETHER

(71) Applicant: Nordischer Maschinenbau Rud. Baader GmbH + Co. KG, Lübeck (DE)

(72) Inventors: Olaf Schwarz, Lübeck (DE); Joachim Härtlein, Lübeck (DE); Michael Fuchs, Lübeck (DE); Uwe Karsten, Lübeck (DE)

(73) Assignee: Nordischer Maschinenbau Rud. Baader GMBH & Co. KG, Luback (DE)

( * ) Notice: Subject to any disclaimer, the term of this patent is extended or adjusted under 35 U.S.C. 154(b) by 513 days.

(21) Appl. No.: 17/617,791

(22) PCT Filed: Jun. 17, 2020

(86) PCT No.: PCT/EP2020/066712
§ 371 (c)(1),
(2) Date: Dec. 9, 2021

(87) PCT Pub. No.: WO2020/254373
PCT Pub. Date: Dec. 24, 2020

(65) Prior Publication Data
US 2022/0234320 A1  Jul. 28, 2022

(30) Foreign Application Priority Data
Jun. 20, 2019  (DE) ......................... 102019116720.5

(51) Int. Cl.
*B30B 9/24* (2006.01)
*A22C 17/00* (2006.01)
(Continued)

(52) U.S. Cl.
CPC ............ *B30B 9/241* (2013.01); *B01D 33/073* (2013.01); *B01D 33/466* (2013.01);
(Continued)

(58) Field of Classification Search
None
See application file for complete search history.

(56) References Cited

U.S. PATENT DOCUMENTS

| 2,027,652 A | 1/1936 | Raisch |
| 2,060,896 A * | 11/1936 | Raisch .................. B01D 33/44 |
| | | 210/396 |

(Continued)

FOREIGN PATENT DOCUMENTS

| DE | 565797 C | 12/1932 |
| DE | 1219905 B | 6/1966 |

(Continued)

*Primary Examiner* — Krishnan S Menon
(74) *Attorney, Agent, or Firm* — DINSMORE & SHOHL LLP (57) ABSTRACT

An apparatus for separating mixed together substances of different flowability has a frame structure and a hollow drum with a perforated circumferential surface driven in a revolving manner and mounted on the frame structure. A pressing element lies externally in the region of the circumferential surface of the drum and is driven in a revolving manner, such that the drum and the pressing element form a product intake wedge for the feeding in a product stream, of material to be pressed. The drum and pressing element also form a pressing region. A discharge element is associated with the pressing element downstream of the pressing region in the product stream conveying direction, for discharging residues that remain on the pressing element after pressing. The discharge element is an actively drivable, endless discharge belt for discharging the residues in a discharge direction. A corresponding method is also provided.

15 Claims, 4 Drawing Sheets

(51) Int. Cl.
*A23N 1/00* (2006.01)
*A23N 4/08* (2006.01)
*B01D 33/073* (2006.01)
*B01D 33/46* (2006.01)
*B01D 33/64* (2006.01)
*B01D 33/76* (2006.01)
*B30B 15/32* (2006.01)
*B65B 69/00* (2006.01)

(52) U.S. Cl.
CPC ........... *B01D 33/642* (2013.01); *B01D 33/76* (2013.01); *B30B 15/32* (2013.01); *A22C 17/00* (2013.01); *A23N 1/00* (2013.01); *A23N 4/08* (2013.01); *B65B 69/00* (2013.01)

(56) References Cited

U.S. PATENT DOCUMENTS

| | | | |
|---|---|---|---|
| 3,570,671 | A | 3/1971 | Crandall et al. |
| 6,106,669 | A | 8/2000 | Gommel et al. |
| 2021/0037837 | A1 | 2/2021 | Gunther |

FOREIGN PATENT DOCUMENTS

| | | | |
|---|---|---|---|
| DE | 102018101985 | B3 | 9/2018 |
| GB | 1162166 | A | 8/1969 |
| JP | S5073271 | A | 6/1975 |

\* cited by examiner

DEVICE AND METHOD FOR SEPARATING SUBSTANCES OF DIFFERENT FLOWABILITY THAT ARE MIXED TOGETHER

CROSS-REFERENCE TO RELATED APPLICATIONS

This application is the U.S. National Stage of PCT/EP2020/066712 filed Jun. 17, 2020, which claims priority to German Patent Application No. 102019116720.5, filed Jun. 20, 2019, the content of both are incorporated herein by reference in their entirety.

FIELD OF THE INVENTION

The invention relates to an apparatus for separating substances of different flowability that are mixed together, comprising a frame structure, a hollow drum having a perforated circumferential surface M which can be driven in a revolving manner and is mounted on the frame structure, a pressing element which lies externally in the region of the circumferential surface M of the hollow drum and can be driven in a revolving manner, such that the hollow drum and the pressing element form a product intake wedge for feeding in a product stream, consisting of material to be pressed, between the hollow drum and the pressing element, and also form a pressing region, wherein there is associated with the pressing element downstream of the pressing region in a conveying direction $T_P$ of the product stream a discharge element for discharging residues of the material to be pressed that remain on the pressing element after pressing.

The invention relates also to a method for separating substances of different flowability that are mixed together, comprising the steps: feeding a product stream, consisting of material to be pressed, into a product intake wedge of an apparatus for separating substances of different flowability that are mixed together, which product intake wedge is formed by a hollow drum having a perforated circumferential surface M and a pressing element, driving the hollow drum and the pressing element in a revolving manner in order to draw the product stream into a pressing region formed between the hollow drum and the pressing element, wherein the more readily flowing constituents of the material to be pressed are pressed by means of the pressing element through the perforation of the circumferential surface M into the inner cavity of the hollow drum and are discharged, while the less readily flowing constituents of the material to be pressed, as residues of the material to be pressed that remain on the pressing element, are discharged downstream of the pressing region in the conveying direction $T_P$ of the product stream by means of a discharge element associated with the pressing element.

Such apparatuses and methods are used in various fields of industry but in particular in the food processing industry. By means of the above-described apparatuses, which are also referred to as separating devices or separators, substances of different kinds can be subjected to a separating process. To that end, the substances to be separated, that is to say the material to be pressed or material to be separated, which is also referred to as the separand, is pressed from outside against the perforated circumferential surface M of the hollow drum by means of the pressing element. Under this pressure, the more readily flowing constituents of the material to be pressed are pressed as the main product through the perforation of the circumferential surface M into the inner cavity of the rotating hollow drum and are discharged, while the less readily flowing constituents of the material to be pressed remain as secondary product externally on the circumferential surface of the hollow drum and in particular also at or on the surface of the pressing element and are delivered separately. The secondary products, which are also referred to as residues of the material to be pressed that remain, can in particular adhere to the pressing element, lie on the pressing element, fall from the pressing element and also fall from the outer circumferential surface M of the hollow drum or be detached therefrom, for example by means of a stripping element. All the residues that are not pressed through the perforation of the circumferential surface M of the hollow drum are conveyed out of the apparatus as a residual stream via the discharge element and are further processed at least in part.

Substances, materials or products which differ, or the composition of which differs, by their mutually different flow behaviours are amenable to such separation. The possibility and/or necessity of separating substances of different flowability that are mixed together exists, for example, in the processing of animal bodies (for example the separation of the flesh as the more readily flowing constituent from the skin, sinews, bones, etc. as the less readily flowing constituents) or parts thereof, in the processing of fruit and vegetables (for example the separation of the pulp as the more readily flowing constituent from the skin, stems, kernels or stones, etc. as the less readily flowing constituents), in the reprocessing of incorrectly packaged foodstuffs (for example the separation of butter or cheese as the more readily flowing constituents from the packaging material as the less readily flowing constituents) or the like. Specific application examples are, for example, the obtainment of residual flesh from animal carcasses or parts thereof, the pitting of dates or the unpacking of cheese slices packaged in film.

In the obtainment of flesh, stoning or unpacking or any other corresponding separation, a product stream consisting of material to be pressed is conveyed, starting from a product feed-in region, via the product intake wedge between the pressing element and the hollow drum to a product delivery region. As the product stream is conveyed between the hollow drum and the pressing element, the product stream passes through a pressing region. The pressing element is positioned at a preselected or pre-set distance, which may also have a value of zero, from the circumferential surface M of the hollow drum. In order to guide the material to be pressed into the pressing region, which is located in the region of the smallest distance between the pressing element and the hollow drum, between the hollow drum and the pressing element and to perform the actual separating operation, the hollow drum and the pressing element are driven in a revolving manner. The substances of different flowability are thereby separated in that the more readily flowing substances, the flesh in the example of the processing of animal bodies or parts thereof, are pressed at least in part into the hollow drum and are discharged from there. The less readily flowing substances, again in the example of the processing of animal bodies or parts thereof the bones, sinews, skin, etc., are discharged downstream of the hollow drum in the conveying direction $T_P$ of the product stream in the delivery region for the residual stream and are collected.

BACKGROUND OF THE INVENTION

In apparatuses according to the prior art, discharging takes place by means of a so-called product chute which is positioned at a small distance from or in contact with the pressing element, such that secondary product lying/adhering on or to the pressing element is detached and/or removed from the pressing element and is discharged from the apparatus solely by the force of gravity along the product chute. The delivery height is limited by the necessary gradient of the chute. The product chute must be positioned so steeply that collecting containers for the secondary products have to be placed very close to the apparatus and the discharged secondary products are always collected at the outer edge of the collecting container that is to be filled with the secondary product, so that the collecting containers must be changed at short intervals. The rigid and fixedly mounted product chute, which is usually produced from a metal sheet, further leads to increased wear of the pressing element specifically in cases in which the product chute is in contact with the pressing element, so that the working life of the components is reduced. Moreover, when a press belt is used as the pressing element—the press belt is pushed upwards at the outer edges by the pressing pressure—gaps are formed between the press belt, which is also referred to as a squeezing belt, and the product chute, in which gaps secondary products can be trapped and accumulate, which can result in disruptions in operation. The mentioned disadvantages lead to reduced productivity and reduced product quality.

SUMMARY OF THE INVENTION

Accordingly, the object of the invention is to provide an apparatus having improved productivity and product quality, and to propose a corresponding method.

This object is achieved by an apparatus of the type mentioned hereinbefore in that the discharge element is an actively drivable, endless discharge belt for discharging the residues of the material to be pressed that remain on the pressing element in a discharge direction $T_R$. The discharge belt, which is guided, for example, around deflection rollers, of which one deflection roller is configured as a drive roller, is arranged at or close to the pressing element, such that the remaining residues can be removed and/or taken over from the pressing element and discharged. By actively discharging the residues, they can reliably be conveyed away from the apparatus, for example into collecting containers, namely in a uniform distribution in particular centrally in the collecting containers. The active discharge of the residual stream results in improved productivity of the apparatus and in increased product quality.

In an operating region with the pressing element for takeover of the residues of the material to be pressed, the discharge belt is advantageously positioned at a minimal distance from the pressing element. The operating region describes the region in which the residues that fall from the pressing element or are detached from the pressing element are taken over. Within the meaning of the invention, minimal distance explicitly also means a distance equal to zero. The size of the minimal distance depends substantially on the material that is to be pressed. In the case of some materials to be pressed, in particular those which have a soft consistency and/or a small proportion of less readily flowing components, the minimal distance is, for example, zero. In other words, the discharge belt is pre-set in contact with the pressing element. Contact of the discharge belt with the pressing element is advantageous in order to effectively be able to detach residues from the pressing element and feed them to the discharge belt. For other materials to be pressed, in particular those with a high proportion of less readily flowing components and/or larger pieces in the material to be pressed, the minimal distance is, for example, a few millimetres. The minimal distance accordingly does not have to be reduced to a fixed value. A distance greater than zero is advantageous for ensuring wear-reducing operation. In other words, an air gap between the discharge belt and the pressing element protects the components which work together for the pressing.

In a preferred further development, the discharge belt and the pressing element are driven in opposite directions in the operating region. With this configuration, particularly effective and reliable stripping and taking over of the residues that are to be discharged from the pressing element is ensured.

A particularly preferred embodiment is characterised in that the discharge belt, as a stripping belt, is a link belt which consists of plastics material and can be driven in a revolving manner and which has at least one web running transversely to the discharge direction $T_R$, wherein the stripping belt is so adjusted relative to the pressing element that there is a minimal distance between each web and the pressing element. With regard to the minimal distance, the description given above applies correspondingly. There is preferably provided a plurality of webs, which are also referred to as cleats or studs. The webs/cleats are arranged spaced apart from one another in the drive direction $A_A$ of the discharge belt/stripping belt and are evenly distributed over the entire discharge belt/stripping belt. The webs/cleats preferably extend perpendicularly to the transport plane $E_A$ of the stripping belt and transversely to the drive direction $A_A$ over the entire width. By means of the webs/cleats, residues can reliably and effectively be scraped from the pressing element. The webs/cleats further ensure reliable detachment of the residues on delivery into the collecting container.

An advantageous further development is characterised in that the endless discharge belt is guided around a rigid, fixed transport section and a take-over section which is pivotable relative to the rigid transport section, wherein the pivotable take-over section is mounted on the transport section so as to be pivotable about a pivot axis A in order to create a movable section of the discharge belt. The transport section and the take-over section, like the deflection and/or drive rollers, are arranged between an upper run and a lower run of the discharge belt and can be arranged, or mounted or held, for example, on the frame structure. The transport section forms a substantially horizontally oriented support surface for the discharge belt in the region of the upper run. The take-over section is oriented so as to be bent/sloping relative to the transport section and faces the operating region or forms the operating region with the pressing element. As a result of the movability of the take-over section relative to the transport section, the apparatus can be used product-independently since the discharge belt, or the positioning thereof relative to the pressing element, can easily be adapted to different products. Furthermore, the pivotability of the take-over section allows it to be adjusted and adapted to different positions of the pressing element, in the example of a press belt as the pressing element to changes in the belt run caused, for example, by wear or pre-setting.

The pivotable take-over section is advantageously mounted on the frame structure in a spring-loaded manner. With this configuration, the advantages described hereinbefore can be achieved more effectively. Owing to the spring loading of the take-over section, the take-over section is able to yield, for example, away from constituents of the residues which, for example, adhere to the pressing element and are not taken up by the discharge belt, downwards/outwards against the spring force, that is to say away from the pressing element, whereby the components which work together for the pressing are protected.

A preferred further development is distinguished by the fact that there is associated with the pivot axis A an adjusting arm which is connected via a spring element to an adjusting element which is arranged on the frame structure. The spring force can be adjusted with the spring element and the adjusting element, so that different products can be detached and/or taken over from the pressing element with different spring forces.

The adjusting arm expediently lies, by means of the spring force of the spring element, against an abutment element arranged on the frame structure, wherein the abutment element is configured so as to be movable for adjustment of the size of the distance between the discharge belt in the region of the pivotable take-over section and the surface of the pressing element, that is to say in the operating region. The abutment element, in conjunction with the spring element, also results in individual adaptation of the apparatus to different products and/or operating states and conditions. By changing the abutment element, or the position of the abutment element, the size of the distance of the discharge belt from the pressing element can be changed, for example, and adapted to the product to be processed and/or different operating states and conditions. The spring element in principle holds the take-over section in the pre-set position against the abutment. Against the spring force, the take-over section can be removed or lifted from the abutment element, for example triggered by solid constituents in the residual stream to be discharged.

A particularly preferred embodiment is characterised in that the pressing element is an endless press belt which can be pressed from outside against the circumferential surface M, while wrapping around part of the circumference of the hollow drum, and which can be driven in a revolving manner and comprises an upper run, facing the hollow drum, and a return run, wherein there is arranged on the side of the press belt remote from the hollow drum a support apparatus for the press belt having at least one support element. The press belt as the pressing element is particularly suitable for cooperation with a discharge belt as the discharge element, since on the one hand a larger and thus more effective operating region can be created and on the other hand residues that fall or are stripped from the hollow drum can also be taken up by the press belt and conveyed into the operating region with the discharge belt.

The press belt is advantageously guided downstream of the pressing region in the conveying direction $T_P$ of the product stream around a pressure roller which is adjustable relative to the hollow drum, wherein the pivotable take-over section of the discharge belt is positioned beneath the pressure roller. With this configuration and arrangement, particularly effective takeover of the residues that adhere to the press belt and fall from the press belt is ensured. By placing the pivotable take-over section of the discharge belt beneath the adjustable pressure roller, it is possible to respond directly to changes in the position of the pressure roller, for example due to wear of the hollow drum or caused by the product stream to be pressed, in that the position of the discharge belt can be adjusted to maintain the optimum distance from the press belt guided around the pressure roller.

A preferred embodiment is characterised in that the pivotable take-over section of the discharge belt, which extends over the entire width of the press belt, has an ascending orientation in the operating region, while the lower run of the press belt has a descending orientation in the operating region. Reliable and safe as well as effective takeover of the residues that occur is thereby ensured.

The discharge belt and the press belt expediently run substantially parallel at least in some regions in order to form a planar operating region. By means of the almost overlapping arrangement of the press belt and the discharge belt, a planar take-over region or operating region, in contrast to a linear take-over edge, is created, with which the residues to be discharged can more effectively be taken over from the pressing element and discharged.

The object is also achieved by a method having the steps mentioned hereinbefore in that the residues of the material to be pressed that remain on the pressing element after pressing are actively discharged in the discharge direction $T_R$ by means of an actively drivable, endless discharge belt.

Preferably, the residues of the material to be pressed that remain on the pressing element after pressing are detached by means of the discharge belt which can be driven in a revolving manner in a planar operating region from an endless press belt, which can be driven in a revolving manner, as the pressing element, are taken over and are discharged contrary to the drive direction $A_P$ of the press belt.

The residues of the material to be pressed that remain on the pressing element after pressing are preferably discharged from the apparatus substantially horizontally and delivered approximately centrally into a collecting container.

The method is particularly preferably carried out with an apparatus as described herein.

The advantages arising therefrom have already been described in detail in connection with the apparatus, and for this reason, in order to avoid repetition, reference may be made to the corresponding statements.

BRIEF DESCRIPTION OF THE DRAWINGS

Further expedient and/or advantageous features and further developments of the apparatus will become apparent from the description. Particularly preferred embodiments of the apparatus and the method will be explained in greater detail with reference to the accompanying drawing, in which.

DETAILED DESCRIPTION OF THE INVENTION

The apparatus illustrated in the drawing serves to separate a product stream of material to be pressed, which consists predominantly of flesh, fat, cartilage, sinews, skin, bones (bone residues), etc., wherein in particular the flesh and the fat are considered to be more readily flowing constituents and the cartilage, the skin, the sinews and the bones (bone residues) are considered to be less readily flowing constituents. The apparatus is, however, equally usable for separating other materials to be pressed and combinations of materials to be pressed.

The illustrated apparatus 10 is configured and adapted for separating substances of different flowability that are mixed together and comprises a frame structure 11, a hollow drum 12 having a perforated circumferential surface M which can be driven in a revolving manner and is mounted on the frame structure 11, a pressing element 13 which lies externally in the region of the circumferential surface M of the hollow drum 12 and can be driven in a revolving manner, such that the hollow drum 12 and the pressing element 13 form a product intake wedge 14 for feeding a product stream consisting of material to be pressed between the hollow drum 12 and the pressing element 13, and a pressing region P, wherein a discharge element 15 for discharging residues of the material to be pressed that remain on the pressing element 13 after pressing is associated with the pressing element 13 downstream of the pressing region P in the conveying direction $T_P$ of the product stream.

This apparatus 10 is distinguished according to the invention by the fact that the discharge element 15 is an actively drivable, endless discharge belt 16 for discharging the residues of the material to be pressed that remain on the pressing element 13 in the discharge direction $T_R$.

The features and further developments described hereinbelow represent preferred embodiments taken on their own or in combination with one another. It is expressly pointed out that features which are combined in the claims and/or the description and/or the drawing or described in a common embodiment can also further develop the apparatus 10 described above functionally independently.

Figure 1:
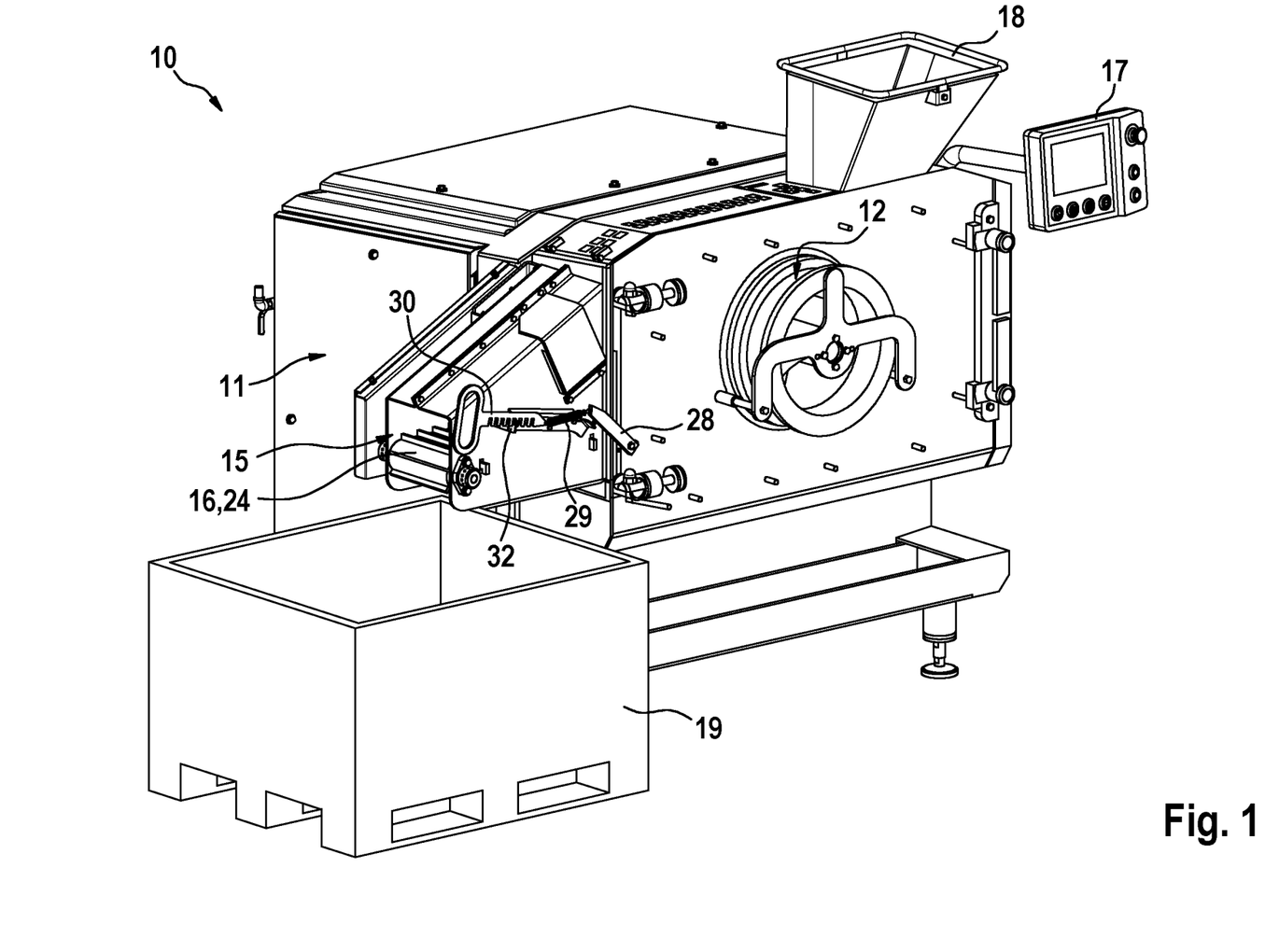
FIG. 1 is a schematic illustration of an embodiment according to the invention of the apparatus having a press belt as the pressing element in a perspective view.
Figure 3:
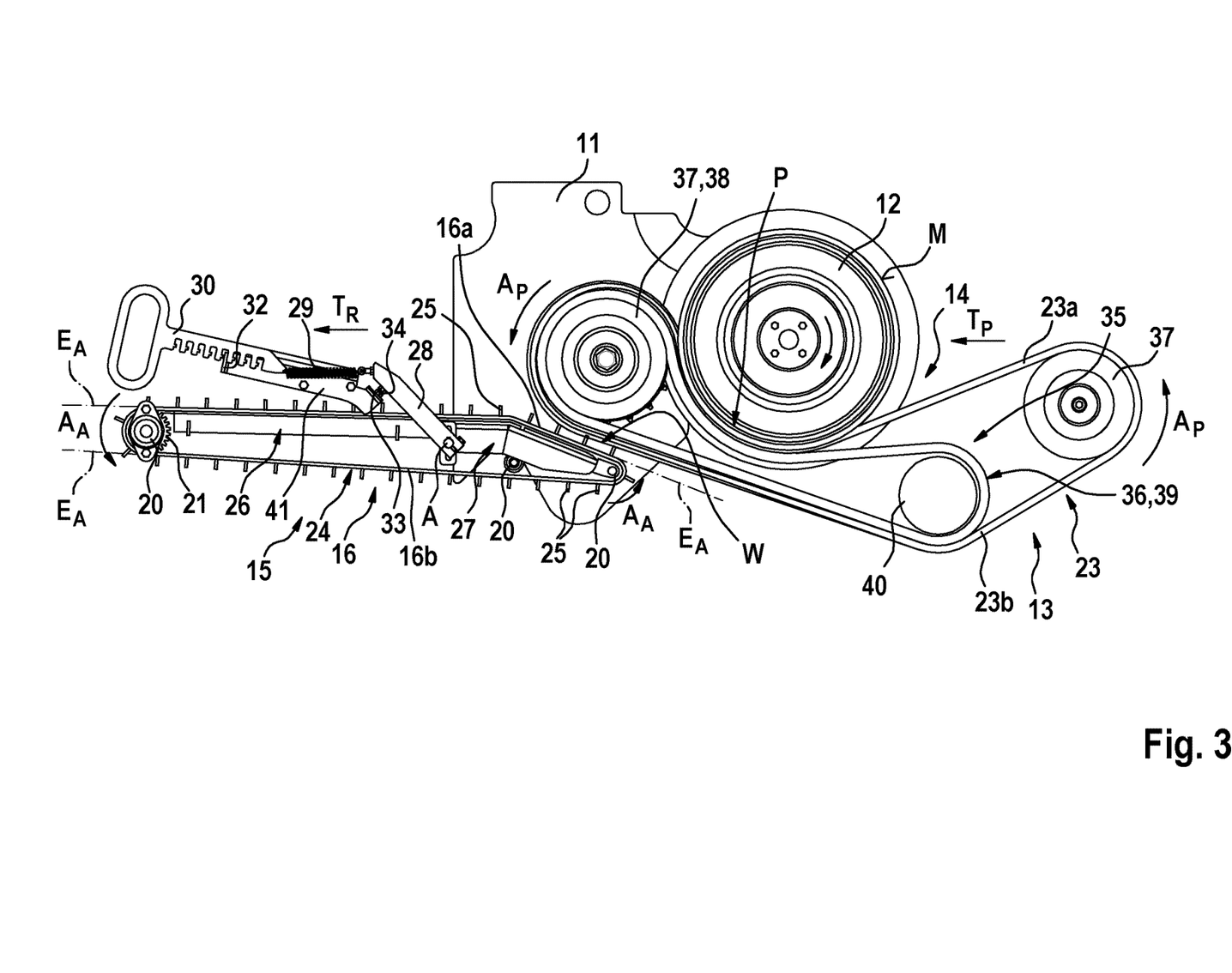
FIG. 3 shows the illustration according to FIG. 2 in a front view.
Figure 4:
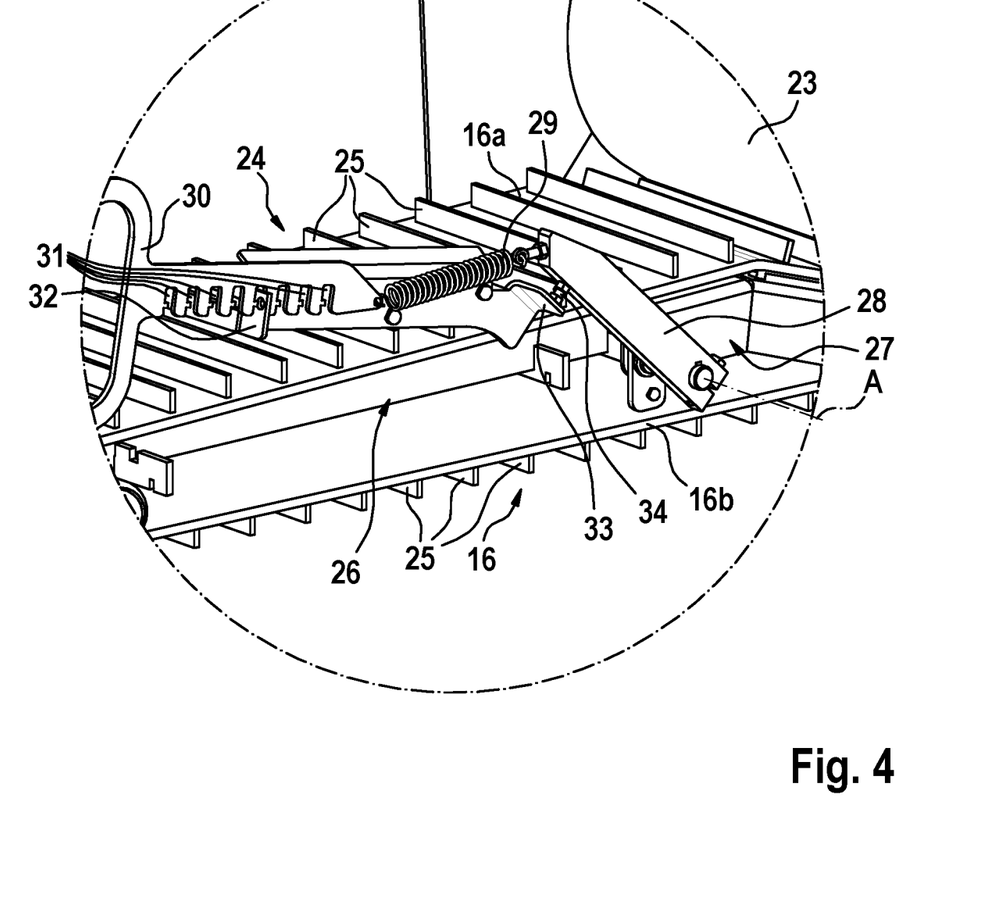
FIG. 4 shows an enlarged detail of the locking device according to FIG. 2.

The frame structure 11 can be, for example, a profile construction or an at least partially closed housing. Associated with the hollow drum 12 is a drive, not illustrated explicitly. By means of the drive, the hollow drum 12 can be driven in both directions. The hollow drum 12 is preferably driven clockwise in the drive direction (see in particular FIG. 3). The apparatus 10 can be equipped with individual drives for the hollow drum 12 and the pressing element 13, which can likewise be driven in both directions, or with a common drive and transmission elements. The or each drive can be connected to a control and/or regulating device, likewise not illustrated explicitly. The apparatus 10 can be operated, for example, via a control panel 17. The apparatus 10 can be supplied with the product stream to be separated optionally, for example, via a chute, a feed-in funnel 18 as in FIG. 1 or an actively driven feed-in member. The main product obtained in the apparatus 10, namely the more readily flowing constituents of the material to be pressed which are pressed by the pressing element 13 through the perforation of the hollow drum 12 into the inner cavity H of the hollow drum 12, are discharged from the hollow drum 12 and processed further by components which are not illustrated explicitly. The secondary product, namely the less readily flowing constituents of the material to be pressed which are not pressed through the perforation and, on conveying through the apparatus 10, remain externally on the hollow drum 12 and in particular at and on the pressing element 13 as residue, are actively conveyed by means of the discharge belt 16 as a residual stream, for example, centrally into a collecting container 19, collected therein and optionally processed further.

The discharge belt 16 is guided at least around two deflection elements 20 and has an upper run 16a (transport run) and a lower run 16b (return run). A drive 21 is preferably associated with a deflection element 20, which drive can likewise be connected to the control and/or regulating device. The discharge belt 16 is preferably likewise supported or arranged on the frame structure 11 at least in the region of the driven deflection element 20. The delivery belt 16 can, however, also be configured and positioned separately from the frame structure 11. By means of the drive 21, the discharge belt 16 can be driven in both directions. The discharge belt 16 is preferably driven counter-clockwise in the drive direction $A_A$ (see in particular FIG. 3). The secondary product to be discharged from the apparatus 10, that is to say the residual stream of the material to be pressed consisting of the less readily flowing constituents, is correspondingly conveyed in the discharge direction $T_R$. The (resulting) discharge direction $T_R$ of the residual stream corresponds preferably and substantially to the (resulting) conveying direction $T_P$ of the product stream through the pressing region P.

Figures 2, 2A:
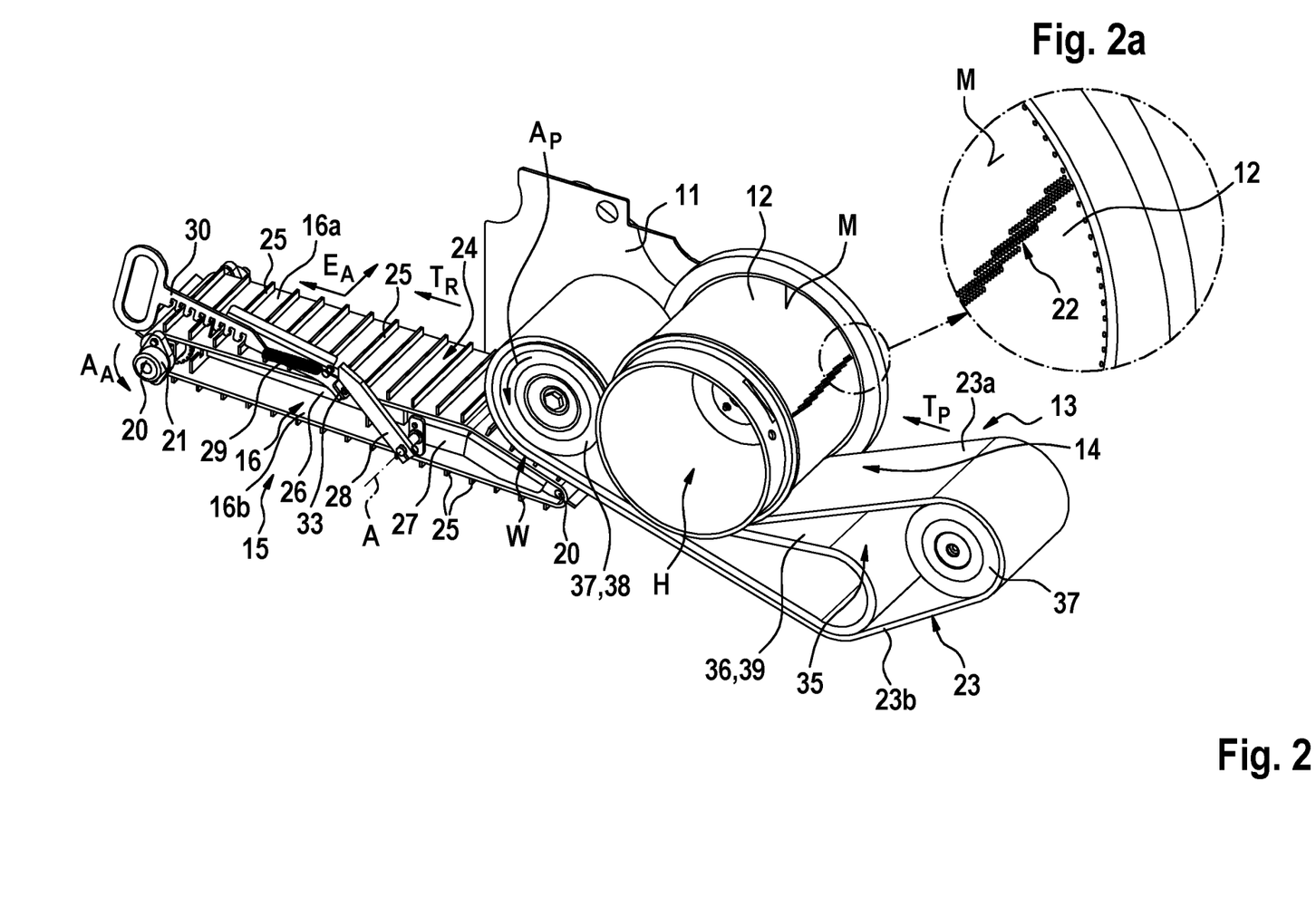
FIG. 2 is a schematic illustration of the apparatus without the frame structure in a perspective illustration.
FIG. 2a shows an enlarged detail of the circumferential surface of the hollow drum according to FIG. 2.

As mentioned, the hollow drum 12 has a perforated circumferential surface M. In FIG. 2a, the hole pattern 22 as the perforation can be seen in the enlarged detail. The number, size and arrangement of the holes, openings, bores or the like can vary. The perforation preferably extends over the entire circumferential surface M. In FIG. 2, the perforation has substantially not been illustrated for the sake of clarity. For pressing the material to be pressed against the hollow drum 12 and in part through the perforation into the hollow drum 12, the pressing element 13 is preferably positioned with an adjustable pressing force spaced apart from or in contact with the circumferential surface M. The pressing element 13 can also be configured and arranged relative to the hollow drum 12 so as to yield, for example via a spring element or via a pneumatic cylinder or the like. In embodiments which are not illustrated, the pressing element 13 is, for example, a pressing drum which can be driven in a revolving manner. Preferably, however, the pressing element 13 is a press belt 23 which can be driven in a revolving manner and which will be described in detail hereinbelow.

In an operating region W with the pressing element 13 for the takeover of the residues of the material to be pressed, the discharge belt 16 is positioned at a minimal distance from the pressing element 13. The minimal distance can be zero. This means that the discharge belt 16 with the upper run 16a is in contact with the pressing element 13 at least in part or in some regions, in order, for example, to be able to scrape off residues adhering to the pressing element 13 particularly effectively. The pre-set distance can, however, also be greater than zero, for example in a size range between 1 mm and 3 mm or in a size range between 5 mm and 10 mm. Ultimately, other distances can of course also be chosen in dependence on the product stream to be processed.

As already mentioned, the discharge belt 16 and the pressing element 13 can each be driven arbitrarily, namely in terms of speed and drive direction. The discharge belt 16 and the pressing element 13 are preferably driven in opposite directions in the operating region W, so that a relative movement is provided for effectively detaching and/or taking over the residues of the product stream from the pressing element 13 onto the discharge belt 16. Particularly preferably, the discharge belt 16, as a stripping belt 24, is a link belt which consists of plastics material and can be driven in a revolving manner and which has at least one web 25 running transversely to the discharge direction $T_R$, wherein the stripping belt 24 is so adjusted relative to the pressing element 13 that there is a minimal distance between each web 25 and the pressing element 13. With regard to the minimal distance, the statements made above apply correspondingly. In the form shown, the stripping belt 24 is provided with equally spaced webs 25 over its entirety. The webs 25 extend transversely to the discharge direction $T_R$ over the entire width of the stripping belt 24. Starting from the transport plane $E_A$ of the stripping belt 24, the webs 25 in the illustrated embodiment extend perpendicularly upwards and are in contact with the pressing element 13, or the press belt 23, in the operating region W. Instead of the webs 25, other carriers, strippers, scrapers or the like can also be provided. The stripping belt 24 can also consist of other materials. For example, a chain conveyor of metal which has rubber lips as the webs 25 can also be used. The number, configuration, distribution and positioning of the webs 25 can also vary. In embodiments which are not illustrated, a discharge belt 16 without webs 25 or the like, for example with a rough or structured surface, can also be used.

In the illustrated embodiment, the endless discharge belt 16 is guided around a rigid, fixed transport section 26 and a take-over section 27 which is pivotable relative to the rigid transport section 26, wherein the pivotable take-over section 27 is mounted on the transport section 26 so as to be pivotable about a pivot axis A in order to create a movable section of the discharge belt 16. The transport section 26 and the take-over section 27 are arranged between the upper run 16a and the lower run 16b and are provided in addition to the deflection elements 20. In particular the take-over section 27 can optionally also replace individual deflection elements 20. The transport section 26 can be formed, for example, of a plate or of simple profiles which support the discharge belt 16 in the region of the upper run 16a. The transport section 26 is preferably secured to the frame structure 11 and forms the fixed part of the stripping belt 24. The pivotable take-over section 27 is preferably held in a spring-loaded manner on the frame structure 11 and forms the movable part of the stripping belt 24 which yields against the spring force. The take-over section 27 is preferably in bent form, for example in the form of a bent metal sheet, for better positioning relative to the pressing element 13 and to form an operating region W of maximum size. The form and configuration of the take-over section 27 and the orientation of the take-over section 27 relative to the transport section 26 can, however, vary.

The take-over section 27 can be held in a spring-loaded manner directly on the frame structure 11 with its pivot axis A. There is preferably associated with the pivot axis A an adjusting arm 28 which is connected in a rotationally fixed manner to the pivot axis A and is connected via a spring element 29 to an adjusting element 30 which is arranged on the frame structure 11. The adjusting element 30 can have, for example, a plurality of latching positions 31, which can be brought into engagement with a latching lug 32 fastened to the frame structure 11. The adjusting element 30 with the latching positions 31 and the latching lug 32, and also the spring element 29 form an adjusting device. The spring force can be adjusted via the different latching positions 31. Instead of the spring element 29 with the adjusting element 30, a pneumatic cylinder, for example, can also be used. In other further developments, the force can also be applied by means of magnets.

The adjusting arm 28 lies by means of the spring force of the spring element 29 against an abutment element 33 arranged on the frame structure 11, wherein the abutment element 33 is configured so as to be movable in order to adjust the size of the distance between the discharge belt 16 in the region of the pivotable take-over section 27 and the surface of the pressing element 13, that is to say in the operating region W. To this end, the abutment element 33 in the example shown comprises an adjusting screw 34, by means of which the position of the abutment can be changed by turning. The abutment element 33 can also be configured in a different way. The abutment element 33 with the adjusting screw 34 on the one hand and the latching lug 32 on the other hand can also be arranged on a common rail 41, which is releasably fastened to the frame structure 11.

As has already been mentioned above, the pressing element 13 is preferably a press belt 23, namely an endless press belt 23 which can be pressed from outside against the circumferential surface M, while wrapping around part of the circumference of the hollow drum 12, which press belt can be driven (in both directions) in a revolving manner and comprises an upper run 23a (pressing run), facing the hollow drum 12, and a lower run 23b (return run), wherein there is arranged on the side of the press belt 23 remote from the hollow drum 12 a support apparatus 35 for the press belt 23 having at least one support element 36. The press belt 23 is guided around a plurality of deflection elements 37, wherein one deflection element 37 is configured and adapted as a drive roller 38. The drive roller 38 is optionally at the same time configured as a movable pressure roller. By means of the drive roller 38, the press belt 23 can preferably be driven counter-clockwise in the drive direction $A_P$ (see in particular FIG. 3).

The support element 36 is preferably a support chain 39 which is guided around the drive roller 38 and at least one additional deflection element 40. The support chain 39 is configured and adapted to be movable for adjusting the pressure of the press belt 23 against the hollow drum 12, preferably via the movably configured pressure roller. The support element 36 can, however, also be configured in a different way, for example by a roller conveyor or the like. Downstream of the pressing region P in the conveying direction $T_P$ of the product stream, the press belt 23 is guided around the pressure roller which is adjustable relative to the hollow drum, wherein the pivotable take-over section 27 of the discharge belt 16 is positioned beneath the pressure roller.

The pivotable take-over portion 27, extending over the entire width of the press belt 23, of the discharge belt 16 has an ascending orientation in the operating region W, while the lower run 23b of the press belt 23 has a descending orientation in the operating region W. The discharge belt 16, guided around the take-over section 27, and the lower run 23b of the press belt 23 are not only driven in opposite directions in the operating region W, but also overlap such that the discharge belt 16 and the press belt 23 run substantially parallel at least in some regions to form a planar operating region W.

The method according to the invention will be explained in greater detail hereinbelow with reference to the drawing:

The method serves to separate substances of different flowability that are mixed together. A product stream consisting of material to be pressed is fed into a product intake wedge 14 of an apparatus 10 for separating substances of different flowability that are mixed together, which product intake wedge is formed by a hollow drum 12 having a perforated circumferential surface M and a pressing element. Feeding in can take place manually or in an automated manner as well as passively or actively. For[[, for]] taking the product stream into a pressing region P formed between the hollow drum 12 and the pressing element 13, the hollow drum 12 and the pressing element 13 are driven in a revolving manner, wherein the more readily flowing constituents of the material to be pressed are pressed by means of the pressing element 13 through the perforation of the circumferential surface M into the inner cavity H of the hollow drum 12 and are discharged, while the less readily flowing constituents of the material to be pressed, as residues of the material to be pressed that remain on the pressing element 13, are discharged in the form of a residual stream downstream of the pressing region P in the conveying direction $T_P$ of the product stream by means of a discharge element 15 associated with the pressing element 13.

This method is distinguished according to the invention by the fact that the residues of the material to be pressed that remain on the pressing element 13 after pressing are actively discharged in the discharge direction $T_R$ by means of an actively drivable, endless discharge belt 16.

The product stream, which consists, for example, of a mixture of flesh, fat, sinews, cartilage and skin as the material to be pressed, is drawn into the pressing region P, in an apparatus 10 in which the pressing element 13 is a press belt 23, by the hollow drum 12 and the press belt 23, which are driven in the same direction in the pressing region P. The more readily flowing constituents (flesh, fat) are pressed through the perforation into the hollow cavity H of the hollow drum 12 and are discharged. The less readily flowing constituents (skin, cartilage, sinews) remain as a residual stream at and on the press belt 23 and/or at the circumferential surface M of the hollow drum 12. The material adhering to the circumferential surface M can be scraped from the circumferential surface M by suitable stripping elements, for example, and falls onto the press belt 23 downstream of the hollow drum 12 in the conveying direction $T_P$ of the product stream. Because the press belt 23 is driven in a revolving manner, the collected residual stream encounters the discharge belt 16. Some constituents of the residual stream fall from the press belt 23 onto the discharge belt 16. Other constituents of the residual stream which adhere to the press belt 23 are detached from the press belt 23 in the operating region W of the press belt 23 and the stripping belt 24 as the discharge belt 16 by the webs 25 of the stripping belt 24 and, because the stripping belt 24 is driven in a revolving manner in the drive direction $A_A$, are discharged in the conveying direction $T_R$.

The residues of the material to be pressed that remain on the pressing element 13 after pressing are thereby detached by means of the discharge belt 16 which can be driven in a revolving manner from the endless press belt 23 which can be driven in a revolving manner as the pressing element 13 in a planar operating region W, are taken over and discharged contrary to the drive direction $A_P$ of the press belt 23. The residues of the material to be pressed that remain on the pressing element 13 after pressing, that is to say the residual stream, is discharged substantially horizontally from the apparatus 10 and can be delivered approximately centrally into a collecting container 19.

The method is particularly preferably carried out with an apparatus as has been described in detail hereinbefore.

The invention claimed is:

1. An apparatus for separating substances of different flowability that are mixed together, comprising:
    a frame structure;
    a hollow drum having a perforated circumferential surface which is driven in a revolving manner and is mounted on the frame structure;
    a pressing element which lies externally in a region of the circumferential surface of the hollow drum and is driven in a revolving manner, such that the hollow drum and the pressing element form a product intake wedge for feeding in a product stream, consisting of material to be pressed, between the hollow drum and the pressing element, the hollow drum and the pressing element further forming a pressing region; and
    a discharge element associated with the pressing element, the discharge element disposed downstream of the pressing region in a conveying direction of the product stream, the discharge element operable to discharge residues of the material to be pressed that remain on the pressing element after pressing;
    wherein the discharge element comprises an actively drivable, endless discharge belt for discharging the residues of the material to be pressed that remain on the pressing element in a discharge direction; and
    wherein the endless discharge belt is guided around a rigid, fixed transport section and a take-over section which is pivotable relative to the rigid transport section, the pivotable take-over section being mounted on the transport section so as to be pivotable about a pivot axis in order to create a movable section of the discharge belt.

2. The apparatus according to claim 1, wherein the discharge belt is positioned at a minimal distance from the pressing element in an operating region with the pressing element for takeover of the residues of the material to be pressed.

3. The apparatus according to claim 2, wherein the discharge belt and the pressing element are driven in opposite directions in the operating region.

4. The apparatus according to claim 1, wherein the discharge belt is a stripping belt comprising a link belt which consists of plastics material and is driven in a revolving manner, the stripping belt having at least one web running transversely to the discharge direction, the stripping belt being adjusted relative to the pressing element such that there is a minimal distance between each of the at least one web and the pressing element.

5. The apparatus according to claim 1, wherein the pivotable take-over section is mounted on the frame structure in a spring-loaded manner.

6. The apparatus according to claim 1, further comprising an adjusting arm associated with the pivot axis, the adjusting arm being connected via a spring element to an adjusting element which is arranged on the frame structure.

7. The apparatus according to claim 6, wherein the adjusting arm lies, by means of a spring force of the spring element, against an abutment element arranged on the frame structure, the abutment element being configured so as to be movable for adjustment of a size of a distance between the discharge belt in a region of the pivotable take-over section and a surface of the pressing element, namely in an operating region.

8. The apparatus according to claim 1, wherein:
    the pressing element is an endless press belt which is pressed from outside against the circumferential surface, while wrapping around part of a circumference of the hollow drum, the endless press belt being driven in a revolving manner and comprising an upper run, facing the hollow drum, and a lower run; and
    the apparatus further comprising a support apparatus for the press belt having at least one support element, the support apparatus being arranged on a side of the press belt remote from the hollow drum.

9. The apparatus according to claim 8, wherein the press belt is guided downstream of the pressing region in the conveying direction of the product stream around a pressure roller which is adjustable relative to the hollow drum, wherein the pivotable take-over section of the discharge belt is positioned beneath the pressure roller.

10. The apparatus according to claim 9, wherein the pivotable take-over section of the discharge belt has an ascending orientation in an operating region extending over an entire width of the press belt, while the lower run of the press belt has a descending orientation in the operating region.

11. The apparatus according to claim 8, wherein the discharge belt and the press belt run substantially parallel at least in some regions in order to form a planar operating region.

12. A method for separating substances of different flowability that are mixed together, comprising the steps:

feeding the product stream, consisting of the material to be pressed, into the product intake wedge of the apparatus according to claim 1 for separating substances of different flowability that are mixed together, which the product intake wedge is formed by the hollow drum having the perforated circumferential surface and the pressing element; and driving the hollow drum and the pressing element in a revolving manner in order to draw the product stream into the pressing region formed between the hollow drum and the pressing element;

wherein more readily flowing constituents of the material to be pressed are pressed by means of the pressing element through the perforation of the circumferential surface into an inner cavity of the hollow drum and are discharged, while less readily flowing constituents of the material to be pressed, as the residues of the material to be pressed that remain on the pressing element, are discharged downstream of the pressing region in the conveying direction of the product stream by the discharge element associated with the pressing element; and wherein the residues of the material to be pressed that remain on the pressing element after pressing are actively discharged in the discharge direction by means of the actively drivable, endless discharge belt.

13. The method according to claim 12, wherein:

the pressing element comprises an endless press belt;

the residues of the material to be pressed that remain on the press belt after pressing, by means of the discharge belt which is driven in a revolving manner, are detached from the endless press belt, which is driven in a revolving manner, in a planar operating region, and are taken over and are discharged contrary to a drive direction of the press belt.

14. The method according to claim 12, wherein the residues of the material to be pressed that remain on the pressing element after pressing are discharged from the apparatus substantially horizontally and delivered approximately centrally into a collecting container.

15. The method according to claim 12, further comprising providing the apparatus for separating substances of different flowability that are mixed together, comprising:

the frame structure;

the hollow drum having the perforated circumferential surface which is driven in a revolving manner and is mounted on the frame structure;

the pressing element which lies externally in a region of the circumferential surface of the hollow drum and is driven in a revolving manner, such that the hollow drum and the pressing element form the product intake wedge for feeding in the product stream, consisting of the material to be pressed, between the hollow drum and the pressing element, the hollow drum and the pressing element further forming the pressing region; and the discharge element associated with the pressing element, the discharge element disposed downstream of the pressing region in the conveying direction of the product stream, the discharge element operable to discharge the residues of the material to be pressed that remain on the pressing element after pressing;

wherein the discharge element comprises the actively drivable, endless discharge belt for discharging the residues of the material to be pressed that remain on the pressing element in the discharge direction; and wherein the endless discharge belt is guided around a rigid, fixed transport section and the take-over section which is pivotable relative to the rigid transport section, the pivotable take-over section being mounted on the transport section so as to be pivotable about the pivot axis in order to create the movable section of the discharge belt.

* * * * *